US008297328B2

(12) United States Patent
Ushijima

(10) Patent No.: US 8,297,328 B2
(45) Date of Patent: Oct. 30, 2012

(54) COATING FILM TRANSFER TOOL

(75) Inventor: Jun Ushijima, Tokyo (JP)

(73) Assignee: Plus Stationery Corporation, Tokyo (JP)

( * ) Notice: Subject to any disclaimer, the term of this patent is extended or adjusted under 35 U.S.C. 154(b) by 567 days.

(21) Appl. No.: 12/354,813

(22) Filed: Jan. 16, 2009

(65) Prior Publication Data

US 2009/0183838 A1 Jul. 23, 2009

(30) Foreign Application Priority Data

Jan. 18, 2008 (JP) ................................. 2008-009812

(51) Int. Cl.

*B65H 37/00* (2006.01)
*B32B 37/10* (2006.01)
*B32B 37/26* (2006.01)
*B32B 38/14* (2006.01)
*B29C 65/56* (2006.01)
*B29C 65/52* (2006.01)

(52) U.S. Cl. ........ 156/540; 156/443; 156/494; 156/495; 156/579; 156/538

(58) Field of Classification Search .................. 156/230, 156/247, 249, 538, 540, 443, 494–496, 579
See application file for complete search history.

(56) References Cited

U.S. PATENT DOCUMENTS 5,346,580 A * 9/1994 Elges et al. .................. 156/540
5,512,128 A * 4/1996 Manusch et al. .............. 156/577
6,145,770 A * 11/2000 Manusch et al. ........... 242/422.4
6,499,524 B1 * 12/2002 Miller et al. .................. 156/577
7,014,380 B2 * 3/2006 Ono et al. ....................... 401/17
2006/0198685 A1 * 9/2006 Fujii ............................ 400/697

(Continued)

FOREIGN PATENT DOCUMENTS

GB 2456416 A * 7/2009

(Continued)

OTHER PUBLICATIONS

Patent Family of GB2456416A; retrieved Feb. 15, 2012.*

(Continued)

*Primary Examiner* — Sonya Mazumdar
(74) *Attorney, Agent, or Firm* — The Marbury Law Group, PLLC

(57) ABSTRACT

To provide a coating film transfer tool in which a transfer head is loaded within a case in such a manner as to come out of and go back into the case, and in which the excessive pressure on the transfer head which is projected outside the case is absorbed so as to improve the operability of the coating film transfer tool, the coating film transfer tool includes a coating film transfer section which is disposed in an interior of an accommodation case, and the coating film transfer section includes a supply bobbin, a take-up bobbin and a rotation transmitting device for transmitting the rotation of the supply bobbin to the take-up bobbin, and the coating film transfer section also includes a transfer head in such a state that the transfer head is projected from the coating film transfer section around which an unwound transfer tape from the supply bobbin is made to be suspended, a knocking member projected from the rear end of the accommodation case, a rotary member and a rotary support member disposed between the coating film transfer section and the knocking member, and an elastic member for biasing the coating film transfer section to the rearward, wherein the rotary support member has flexible support arms so that the coating film transfer section can be slightly moved back and forth within the accommodation case.

1 Claim, 9 Drawing Sheets

U.S. PATENT DOCUMENTS

2006/0257195 A1 * 11/2006 Chen .............................. 400/697

FOREIGN PATENT DOCUMENTS

| | | | | |
|---|---|---|---|---|
| JP | 2004306619 | A | * | 11/2004 |
| JP | 2007168450 | A | * | 7/2007 |
| JP | 2007190866 | A | * | 8/2007 |

OTHER PUBLICATIONS

Macine translation of JP 2004306619; Nov. 2004.*
Macine translation of JP 2007168450; Jul. 2007.*
Macine translation of JP 2007190866; Aug. 2007.*

* cited by examiner

COATING FILM TRANSFER TOOL

CROSS-REFERENCE TO RELATED APPLICATIONS

The present application is based on and claims the benefit of priority from the prior Japanese Patent Application No. 2008-009812, filed on Jan. 18, 2008; the entire contents of which are incorporated herein by reference.

BACKGROUND OF THE INVENTION

1. Technical Field

The present invention relates to a coating film transfer tool and more particularly to a coating film transfer tool in which a transfer head for transferring a coating film on a surface of a transfer tape on to a transfer receiving surface of a transfer directed object by bringing the transfer tape into press contact with the transfer directed object is loaded within a case in such a manner as to come out of and go back into the case.

2. Background Art

Conventionally, there have been proposed a variety of coating film transfer tools designed to be used in applying glue or correcting erroneous letters. As the configuration of those coating film transfer tools, a coating film transfer tool includes within a case a supply reel in which a supply bobbin around which an unused transfer tape is wound, a take-up reel in which a take-up bobbin around which the used transfer tape which has been unwound from the supply bobbin and has been used is wound round, and a reel linking device for linking the supply reel with the take-up reel, and it has been general practice to provide a slip mechanism for maintaining a constant tension on the transfer tape by taking in a difference in tape transfer amount between the supply reel and the take-up reel in a shaft portion of the supply reel. In addition, as a transfer tape that is used on this coating film transfer tool, a transfer tape has been used in which a coating film is provided on a surface of a resin tape or a paper tape which constitutes a carrier medium in such a manner as to be easily separated from the surface.

In the coating film transfer tool like this, a transfer head is made to project from the case, and the transfer tape is suspended or extended around the transfer head, whereby a coating film on the transfer tape is transferred on to a transfer receiving surface of a sheet of paper or the like by moving the case with the transfer head pressed against the transfer receiving surface of the sheet of paper in a firmly sticking fashion. At the same time as this occurs, the transfer tape is unwound from the bobbin of the supply reel and the used transfer tape is wound round the bobbin of the take-up reel.

In the coating film transfer tool with a mode that the transfer head is projected from the case, a cap is provided for covering the transfer head to prevent the coating film, which is exposed from the case, from drying out or from being accidentally transferred by contacting others. However, users need to remove the cap from the case and reinstall it on the case every time in use, whereby it is an annoying operation.

In Japanese Unexamined Patent Publication No. 2005-1850, as an prior art to protect the coating film of the transfer tape which is suspended or extended around the transfer head, there is proposed a coating film transfer tool to which a protective cover is provided at the front end portion of the case in order to protect the exposed coating film thereon, wherein a spiral groove is formed on the protective cover and a guide projection to mesh with the spiral groove is formed on the case, or vice versa. In this coating film transfer tool, the protective cover slides back and forth relative to the case while being rotated, thereby the transfer head is protected or projected.

In addition, as an art that the transfer head is configured in such a manner as to come out of and go back into the case, there are knocking type coating film transfer tools and sliding type coating film transfer tools. For example, in Japanese Unexamined Patent Publication No. 2006-272949, there is proposed a coating film transfer tool having double knocking push button mechanism, which accommodates a supply reel, a take-up reel, an linking mechanism for linking the supply reel with the take-up reel and a coating film transfer section having a transfer head therein within an outer case. The coating film transfer tool further includes a knocking member which projects from the rear end of the outer case, an elastic member which biases the coating film transfer section to the rearward, and a rotary member which is disposed between the knocking member and the coating film transfer section so as to link the knocking member and the coating film transfer section, wherein the transfer head is projected from the outer case when the knocking member is depressed, and when the knocking member is depressed again, the transfer head is accommodated in the interior of the outer case.

In the knocking type coating film transfer tool described above, the transfer head is fixed in such a state that being projected outside the case after depressing the knocking member. In the event that the transfer head is completely fixed, the transfer head is likely to be damaged and the transfer directed object is also likely to be damaged when the excessive pressure is exerted on the transfer head, thereby the adjustment of pressing force in transferring the coating film is difficult.

SUMMARY OF THE INVENTION

The present invention has been made in view of the problem inherent in the related art that has been described heretofore, and an objective thereof is to provide a coating film transfer tool in which a transfer head is loaded within a case in such a manner as to come out of and go back into the case, and in which the excessive pressure on the transfer head which is projected outside the case is to be absorbed so as to improve the operability of the coating film transfer tool.

According to an aspect of the invention, there is provided a coating film transfer tool includes in the interior of an accommodation case a coating film transfer section, a knocking member which is projected from a rear end of the accommodation case, a rotary member and a rotary support member which are disposed between the coating film transfer section and the knocking member, and an elastic member for biasing the coating film transfer section to the rear, the coating film transfer section includes in the interior thereof a supply bobbin around which an unused transfer tape is wound, a take-up bobbin around which an used transfer tape is wound, and a rotation transmitting device for linking the rotation of the supply bobbin with the rotation of the take-up bobbin and includes a transfer head around which the transfer tape which has been unwound from the supply bobbin is made to suspend in such a manner as to be projected from the coating film transfer section, the rotary support member has a flexible support arm so that the coating film transfer section cause to be slightly moved within the accommodation case back and forth according to a pressure on the transfer head.

In addition, the distal end of the support arm is inclined to the axial direction of the accommodation case, while a sliding support portion with which support arm is brought into abutment is formed on an inner circumferential surface of the accommodation case.

Furthermore, the knocking member includes a sliding projection and the inner circumferential surface of the accommodation case includes a sliding groove, or vice versa, thereby the knocking member is slidable relative to the accommodation case by meshing the sliding projection with the sliding groove.

According to the coating film transfer tool according to the invention that has been described heretofore, the rotary support member with which the rotary member, which is provided to cause the coating film transfer section to come out of and go back into the accommodation case in such a manner as to rotate, is locked has flexible support arms, and the support arms are brought into abutment with the sliding support portion which are provided in the inner circumferential surface of the accommodation case. When a pressing force is exerted on the transfer head, the support arm of the rotary support member is bowed along the sliding support portion according to the pressing force and then the rotary support member is slightly withdrawn. Since the coating film transfer section which is loaded within the accommodation case is biased to the rearward by the elastic member, the coating film transfer section is withdrawn with backward movement of the rotary support member, thereby the coating film transfer section can be slightly moved back and forth in accordance with a pressing force to the transfer head. Consequently, the pressure on the transfer head can be absorbed and the operability of coating film transfer tool can be improved.

Additionally, the distal side of the support arms is formed inclined relative to the axial direction of the accommodation case and is supported by the sliding support potion which is formed in the accommodation case in such a state that the support arms are in abutment with the sliding support portion. Consequently, the rotary support member is fixed to the accommodation case stably in non-operating of the coating film transfer tool and a slide under pressing force on the transfer head is facilitated, thereby the finely movable coating film transfer section can be fulfilled with ease.

Furthermore, the knocking member includes the sliding projection and the inner circumferential surface of the accommodation case includes the sliding groove, or vice versa. Hence, the knocking member is allowed to slide along the axial direction straight while being prevented from rotating relative to the accommodation case.

DESCRIPTION OF THE PREFERRED EMBODIMENT

A coating film transfer tool which constitutes a best mode for carrying out the invention includes in the interior of an accommodation case a coating film transfer section, a knocking member which is projected from a rear end of the accommodation case, a rotary member and a rotary support member which are disposed between the coating film transfer section and the knocking member, and an elastic member for biasing the coating film transfer section to the rear, the coating film transfer section includes in the interior thereof a supply bobbin around which an unused transfer tape is wound, a take-up bobbin around which an used transfer tape is wound, and a rotation transmitting device for linking the rotation of the supply bobbin with the rotation of the take-up bobbin and includes a transfer head around which the transfer tape which has been unwound from the supply bobbin is made to suspend in such a manner as to be projected from the coating film transfer section. The rotary support member has flexible support arms of which the distal ends are inclined to the axial direction of the accommodation case, while sliding support portions with which the support arms are brought into abutment, respectively, are formed on an inner surface of the accommodation case, thereby the support arms of the rotary support member are withdrawn along the sliding support portions according to the pressing force. Consequently, the coating film transfer section can be slightly moved within the accommodation case back and forth.

In addition, sliding projections are provided on the outer circumferential surface of the knocking member, while sliding grooves are formed in the inner circumferential surface of the accommodation case in such a manner that the sliding projections are meshed therewith. Hence, the knocking member is allowed to slide along the axial direction straight while being prevented from rotating relative to the accommodation case.

Hereinafter, the coating film transfer tool of the invention will be described in detail based on the drawings. As is shown in FIG. 1, the coating film transfer tool 1 of the invention is such as to include the coating film transfer section 2 for transferring a coating film onto a transfer directed object, a operation control unit 3 of the knocking mechanism which slides the coating film transfer section 2 back and forth, and the accommodation case 4 in which the coating film transfer section 2 and the operation control unit 3 are installed.

Figure 2:
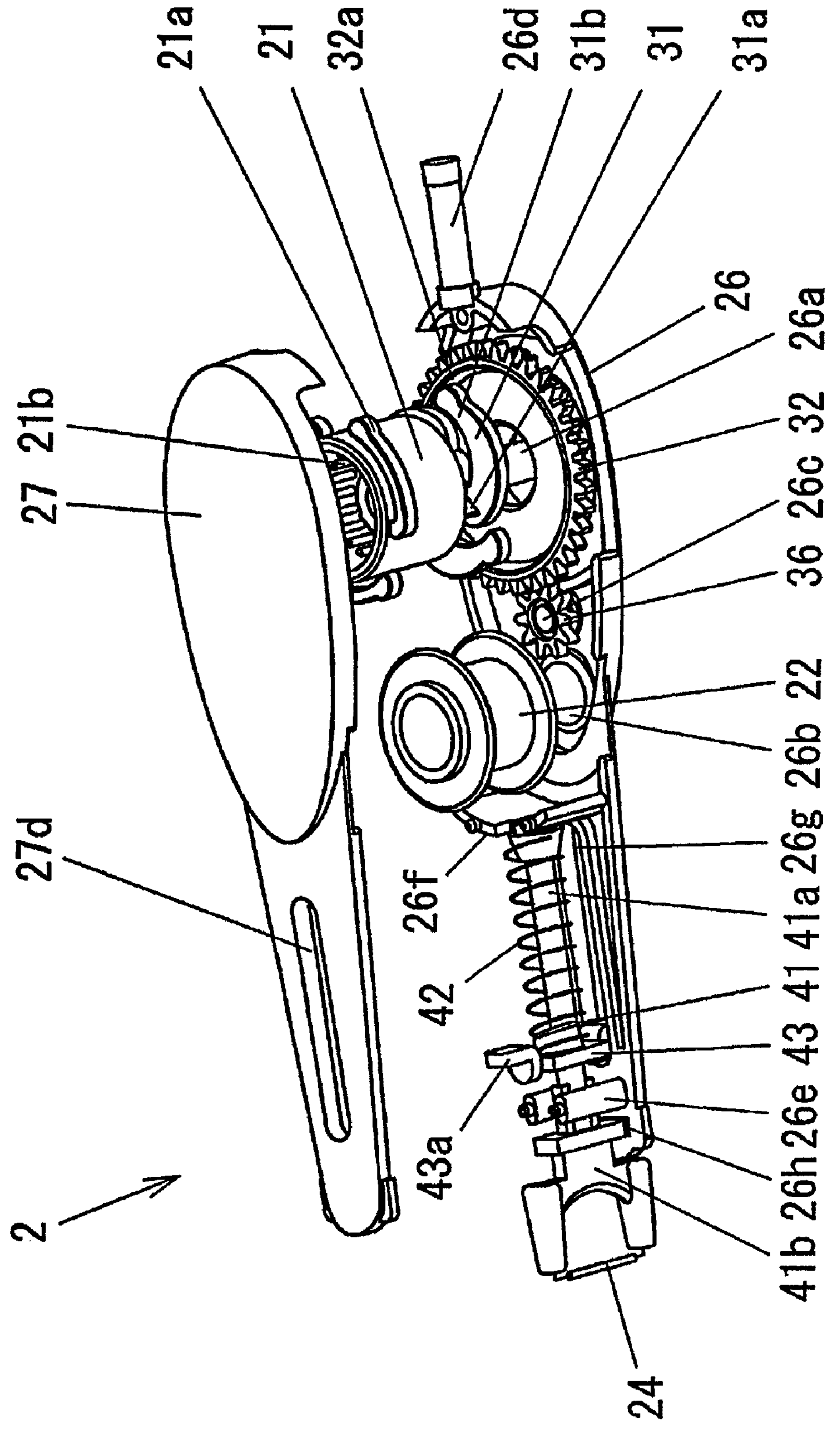
FIG. 2 is an exploded perspective view resulting when a coating film transfer section is seen thereabove which is built in the coating film transfer tool according to the invention.

Note that in the following description in the specification, a direction towards where the transfer head 24 is situated is regarded as forwards, a direction towards where the operation control unit 3 is situated is regarded as rearwards, a side where the first transfer section cover 26 is situated in FIG. 2 is regarded as downwards, and a side where the second transfer section cover 27 is situated is regarded as upwards.

This coating film transfer tool 1 is of a knocking type in which the transfer head 24, which will be described later, is made to protrude from a front end of the accommodation case 4 or withdraw into the accommodation case 4 for accommodation therein by sliding the coating film transfer section 2 in a longitudinal direction by the knocking mechanism. In this configuration, the transfer head 24 is made to protrude from the front end of the accommodation case 4 by the knocking mechanism, and the transfer head 24 is slid on the transfer directed object while being put in press contact therewith, whereby a coating film on the transfer tape 20 which is extended around the transfer head 24 is transferred on to the transfer directed object.

Figure 1:
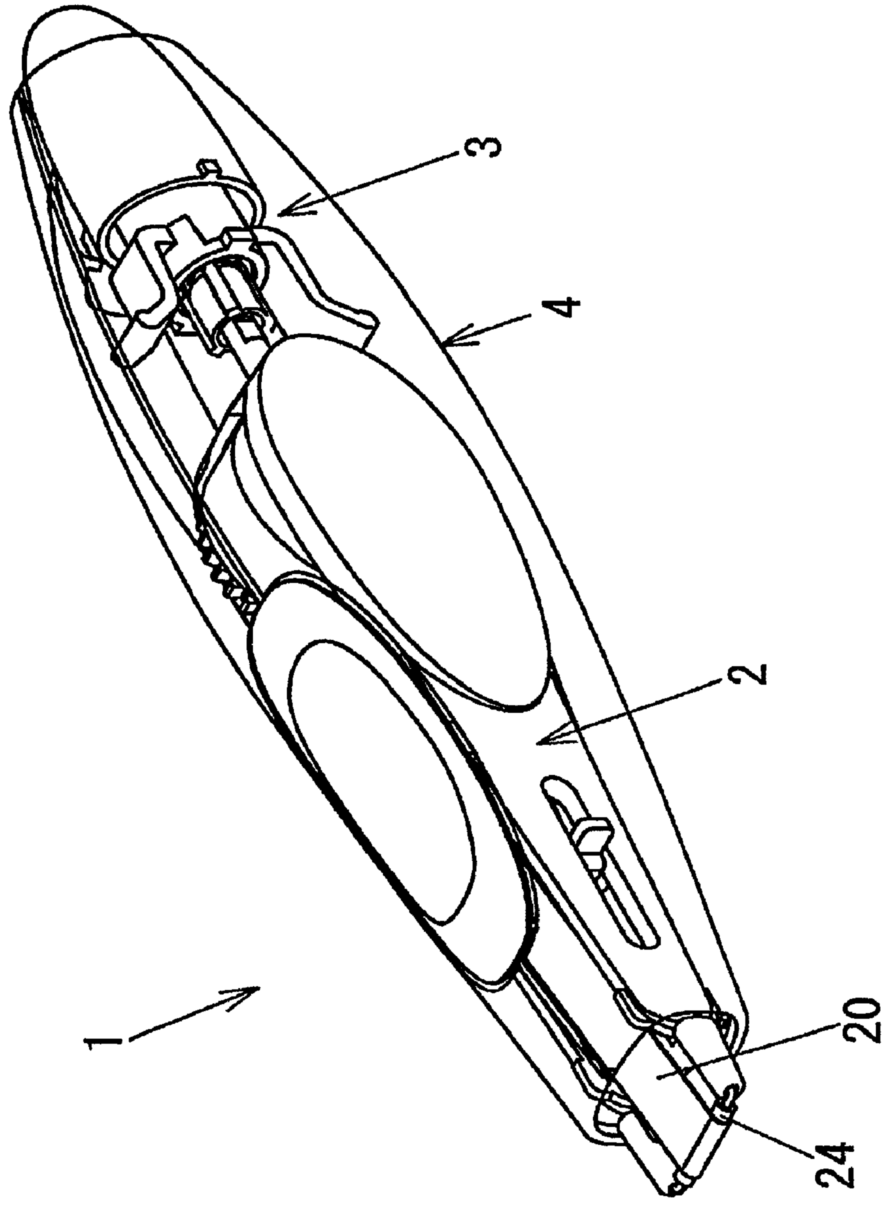
FIG. 1 is a perspective view of a coating film transfer tool according to the invention. In addition.
Figure 3:
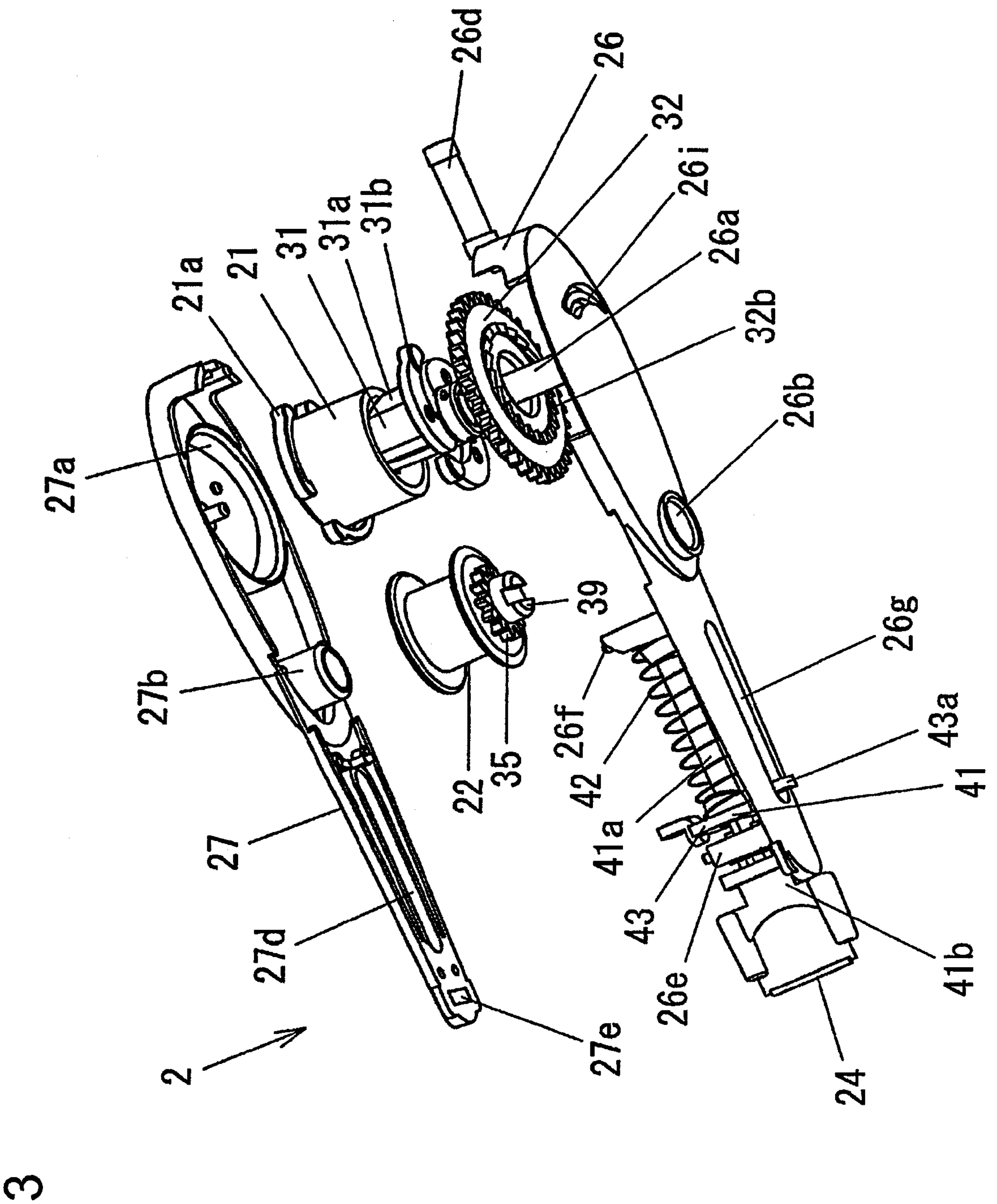
FIG. 3 is an exploded perspective view resulting when the coating film transfer section is seen therebelow which is built in the coating film transfer tool according to the invention.
Figure 4:
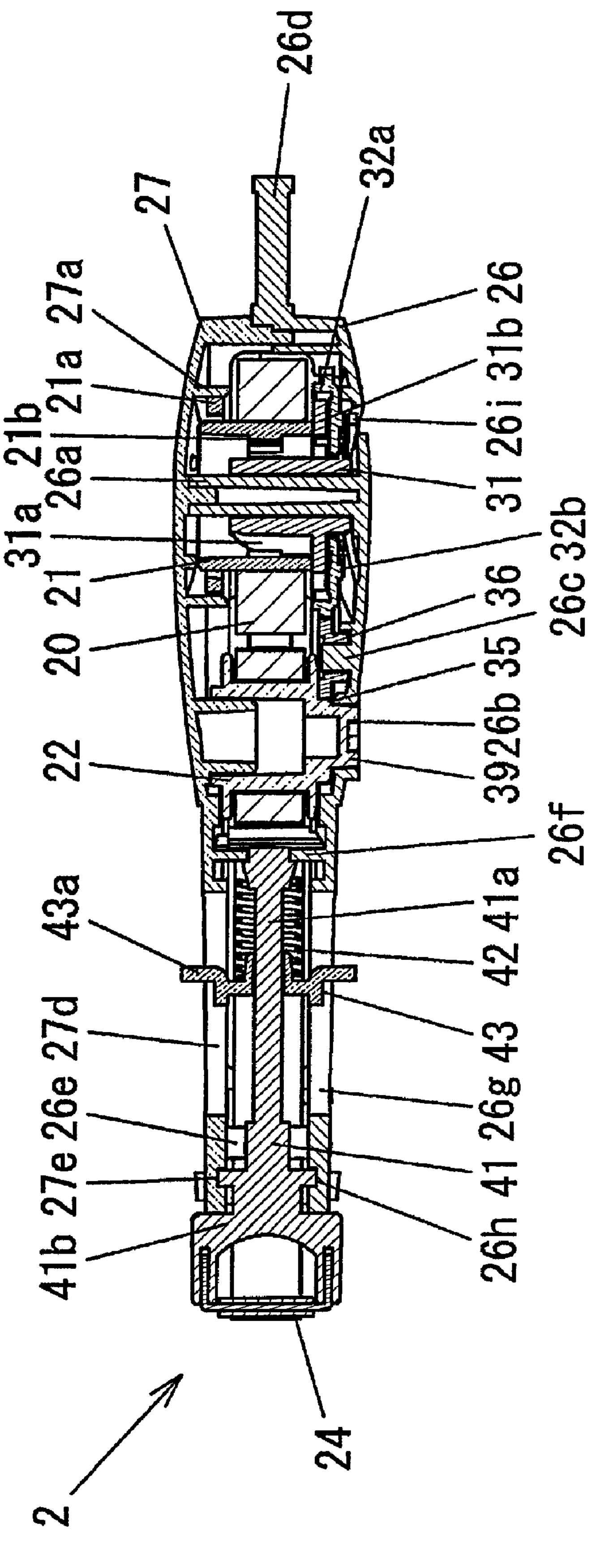
FIG. 4 is a sectional view of the coating film transfer section which is built in the coating film transfer tool according to the invention. In addition.

As is shown in FIGS. 2 to 4, the coating film transfer section 2 includes the supply bobbin 21 around which the transfer tape 20 which is not used is wound, the transfer head 24 around which the transfer tape 20 is extended for transferring the coating film on the transfer tape 20 on to the transfer directed object in a press-sensitive fashion by pressing the coating film on the transfer tape 20 against the transfer directed object, the take-up bobbin 22 for taking up the transfer tape 20 that has been used, the rotation transmitting device for transmitting the rotation of the supply bobbin 21 to the take-up bobbin 22 and controlling the rotation of the take-up bobbin 22, the load adjusting device for adjusting load which causes the supply bobbin 21 not easy to rotate, a transfer head holding member 41, a pressing spring 42 and a locking member 43 which constitute part of the knocking mechanism together with the operation control unit 3 shown in FIG. 1 and the transfer section accommodating case on which these respective members are mounted and which is made up of the first transfer section cover 26 and the second transfer section cover 27.

The transfer tape 20 is made up of a coating film such as a mending tape and a base tape to one side of which the coating film is attached via a separation layer and is connected to the supply bobbin 21 and the take-up bobbin 22 at both ends thereof. The transfer tape 20 is then extended around the transfer head 24 and is adapted to be brought into press contact with the transfer directed object by the transfer head 24 so that the coating film is transferred on to the transfer directed object in the pressure-sensitive fashion.

The supply bobbin 21 is formed into a cylindrical shape which is opened at both ends thereof and has the elastic arms 21*a* which are formed in the vicinity of the one end of the cylindrical supply bobbin 21 in such a manner as to extend from three position thereon to extend along the outer edge of the supply bobbin 21 so as to be brought into press contact with the supply bobbin loosely fastening wall 27*a* of the second transfer section cover 27, which will be described later, thus the elastic arms 21*a* making up part of the load adjusting device. In addition, a plurality of meshing projections 21*b* are formed along an inner circumferential edge of the supply bobbin 21 which mesh with the clutch member 31, which will be described later, and the transfer tape 20 that has not yet been used is wound around an outer circumferential edge of the supply bobbin 21.

The take-up bobbin 22 is such as to include a circular cylinder, an upper circular disc and a lower circular disc which are formed in such a manner as to project outwards from the vicinity of both ends of the circular cylinder on a side surface, respectively, the take-up side gear 35 which is a constituent member of the rotation transmitting device which is formed in such a manner as to project downwards from the center of the lower circular disc, and a take-up assisting portion 39 which is formed in such a manner as to project downwards from the center of the take-up side gear 35. This take-up side bobbin 22 is made to take up the base tape which is the used transfer tape 20 and rotates when the rotation of the supply bobbin 21 is transmitted thereto by the rotation transmitting device. In addition, the take-up assisting portion 39 has a screw head-like configuration at a lower end thereof and is located in a position which confronts a take-up hole 78 of a first accommodation case 4*a*, which will be described later, when the transfer head 24 is accommodated in an interior of the accommodation case 4 shown in FIG. 1, whereby the take-up assisting portion 39 is rotated by a screwdriver or the like being inserted from the take-up hole 78 so as to rotate the take-up bobbin 22 to thereby eliminate looseness in the transfer tape 20.

The transfer head 24 is such that a cylinder is rotatably passed through a flank portion of a metal wire which is formed into a U-shape, and the transfer head 24 is fixed to a front end portion of a transfer head holding member 41, the transfer tape 20 being extended around a side of the cylinder which is allowed to rotate. In addition, by sliding the transfer head 24 around which the transfer tape 20 is so extended while being kept pressed against the transfer directed object, the coating film is transferred on to the transfer directed object in the pressure-sensitive fashion.

The transfer head holding member 41 is made up of a circular strut-like sliding shaft 41*a* which is situated rearwards and a mounting portion 41*b* which is situated forwards and on which the transfer head 24 is mounted. A coil portion of the pressing spring 42 is passed on the sliding shaft 41*a*, and the locking member 43 is suspended from the sliding shaft 41*a*. A locking portion which is locked on a rear holding portion 26*f* of the first transfer section cover 26, which will be described later, is provided on the sliding shaft 41*a* in a position lying in the vicinity of a rear end thereof. In addition, the mounting portion 41*b* includes flat plates which are formed at a boundary with the sliding shaft 41*a* in such a manner as to be inserted into flat plate holding grooves 26*h*, 27*e* in the first transfer section cover 26 and the second transfer section cover 27, which will be described later, and a U-shaped transfer head passage portion which is formed forwards of the flat plates and which has a hole through which a leg of the transfer head 24 is passed. In addition, the transfer head holding member 41 is disposed on the first transfer section cover 26 in such a state that the locking member 43 is suspended from the sliding shaft 41*a*, the pressing spring 42 is mounted behind the locking member 43 in such a manner as to bias the locking member 43 forwards and the transfer head 24 is mounted in the transfer head passage portion.

The locking member 43 includes a square flat plate having a U-shaped cut-out where the locking member 43 is suspended from the sliding shaft 41*a* of the transfer head holding member 41, a pressing spring locking portion which is formed in such a manner as to project rearwards from a rear end circumferential edge of the cut-out and locking claws 43*a* which are formed in such a manner as to project outwards from two sides which intersect the side where the cut-out in the flat plate is formed at right angles.

Then, the locking member 43 is suspended from the sliding shaft 41*a* of the transfer head holding member 41 at the cut-out thereof, and the coil portion of the pressing spring 42 which is passed over the sliding shaft 41*a* of the transfer head holding member 41 is attached to the pressing spring locking portion, and the locking claws 43*a* of the locking member 43 are passed through sliding rails 26*g*, 27*d* in the first transfer section cover 26 and the second transfer section cover 27, which will be described later, so as to be locked with locking portions 72*a*, 72*b* of the accommodation case 4, which will be described later. In addition, in order for the locking claws 43*a* of the locking member 43 to be locked with the locking portions 72*a*, 72*b* of the accommodation case 4, the coating film transfer section 2 can be biased rearwards within the accommodation case 4 by virtue of elastic force of the pressing spring 42 which is inserted behind the locking member 43.

The rotation transmitting device includes the substantially circular cylindrical clutch member 31 which is linked with the supply bobbin 21 for rotation, the supply side gear 32 with which the clutch member 31 is brought into press contact, the take-up side gear 35 of the take-up bobbin 22 which has a diameter smaller than that of the supply side gear 32, and the connecting gear 36 which is adapted to mesh with the supply side gear 32 and the take-up side gear 35 so as to link the supply side gear 32 with the take-up side gear 35 for rotation.

This clutch member 31 includes a cylinder which is opened at both ends thereof, three meshing teeth 31*a* which are formed in three locations at equal intervals on a side of the cylinder from the vicinity of the upper end to the vicinity of the lower end in such a manner as to mesh with the meshing projections 21*b* on the supply bobbin 21 and supply side gear loosely fastening arms 31*b* which are formed in the vicinity of a lower end of the meshing teeth 31*a* in such a manner as to extend along a circumferential edge of the cylindrical clutch member 31 so as to be brought into press contact with a clutch member loosely fastening wall 32*a* of the supply side gear 32, which will be described later, the lower end of the cylinder slightly projecting downwards from the positions where the supply side gear loosely fastening arms 31*b* are formed. In addition, the clutch member 31 is linked with the supply bobbin 21 for rotation by the cylinder of the clutch member 31 being passed through into the cylinder of the supply bobbin 21 and the meshing projections 21*b* formed within the cylinder of the supply bobbin 21 being made to mesh with the meshing teeth 31*a* of the clutch member 31 and is rotatably passed over the holding shaft 26*a* of the first transfer section cover 26.

In addition, the supply side gear 32 is formed into a substantially circular disc and has an opening in the center. The supply gear 32 includes a clutch member loosely fastening wall 32*a* on an upper surface of which a recessed portion is formed. Teeth adapted to mesh with the connecting gear 36 are formed on an outer circumferential edge, and locking teeth 32*b* which are locked with a reverse rotation preventing arm 26*i* on the first transfer section cover 26, which will be described later, are formed on a lower surface of the supply side gear 32. Then, the lower end of the cylindrical clutch member 31 is rotatably passed through the opening in the supply side gear 32, and the supply side gear loosely fastening arm 31*b* of the clutch member 31 is inserted into the recessed portion on the upper surface in such a manner that the supply side gear loosely fastening arm 31*b* of the clutch member 31 is brought into press contact with the clutch member loosely fastening wall 32*a* in such a manner as to allow a slip therebetween, whereby rotational force transmitted to the take-up bobbin 22 is controlled by virtue of slip torque produced between the clutch member loosely fastening wall 32*a* and the supply side gear loosely fastening arm 31*b*. In addition, the reverse rotation of the supply side gear 32 is prevented by the locking teeth 32*b* being brought into engagement with the reverse rotation preventing arm 26*i* of the first transfer section cover 26.

The first transfer section cover 26 of the transfer section accommodating case is made up of a bobbin holding portion which is situated at the rear and a sliding portion which is situated at the front. The bobbin holding portion includes the holding shaft 26*a* which is formed in a position lying in the vicinity of a rear end of the bobbin holding portion in such a manner as to project upwards so that the supply bobbin 21 can be passed thereover, a take-up bobbin passage hole 26*b* which is formed in a position lying in the vicinity of a front end of the bobbin holding portion so that the take-up assisting portion 39 of the take-up bobbin 22 is rotatably passed therethrough, a connecting gear shaft 26*c* which is formed in a position lying between the holding shaft 26*a* and the take-up bobbin passage hole 26*b* in such a manner as to project upwards so that the connecting gear 36 is attached pivotally thereto, and the reverse rotation preventing arm 26*i* which is formed on a circumferential edge of the holding shaft 26*a*, and a rear end wall is formed at the rear end of the bobbin holding portion, a locking strut 26*d* adapted to be locked with the operation control unit 3 being formed on the rear end wall in such a manner as to extend rearwards.

In addition, on the sliding portion of the first transfer section cover 26, a front holding portion 26*e* and a rear holding portion 26*f* which hold the transfer head holding member 41 are formed, respectively, in the vicinity of a front end and at a rear end in such a manner as to project upwards, and the sliding rail 26*g* along which the locking claw 43*a* of the locking member 43 slides is formed on a flat plate between the front holding portion 26*e* and the rear holding portion 26*f*. Furthermore, a plurality of projections are provided at upper ends of the front holding portion 26*e* and the rear holding portion 26*f* in such a manner as to fit in fitting holes in the second transfer section cover 27, and the flat plate holding groove 26*h* into which the flat plates on the transfer head holding member 41 are fittingly inserted are formed in the flat plate situated in front of the front holding portion 26*e*.

The second transfer section cover 27 of the transfer section accommodating case is made up of a flat plate-like bobbin holding portion which is situated at the rear and a flat plate-like sliding portion which is situated at the front. This bobbin holding portion includes the circular cylindrical supply bobbin loosely fastening wall 27*a* with which the elastic arms 21*a* of the supply bobbin 21 are brought into press contact in a position in the vicinity of the rear end of the bobbin holding portion and a take-up bobbin passage hole 27*b* which is inserted into the upper opening of the take-up bobbin 22 in a position lying in the vicinity of the front end of the bobbin holding portion.

In addition, in the sliding portion of the second transfer section cover 27, the plurality of fitting holes into which the fitting projections on the second transfer section cover 27 are fitted are formed in the vicinity of front and rear end portions of the sliding portion, and the sliding rail 27*d* through which the locking claw 43*a* of the locking member 43 is formed from the vicinity of a front end to the vicinity of a rear end of the flat plate. In addition, the flat plate holding groove 27*e* into which the flat plate of the transfer head holding member 41 is fittingly inserted is formed in the flat plate positioned in front of the fitting holes formed in the vicinity of the front end.

The load adjusting device is made up of the elastic arms 21*a* on the supply bobbin 21 and the supply bobbin loosely fastening wall 27*a* of the second transfer section cover 27, whereby slip torque is produced by the elastic arms 21*a* on the supply bobbin 21 being brought into press contact with the inner side of the supply bobbin loosely fastening wall 27*a* of the second transfer section cover 27, so as to apply a load to the rotation of the supply bobbin 21.

In addition, in the coating film transfer section 2, the supply side gear 32, the clutch member 31 and the supply bobbin 21 are sequentially passed through the holding shaft 26*a* of the first transfer section cover 26, whereby the locking teeth 32*b* on the lower surface of the supply side gear 32 and the reverse rotation preventing arm 26*i* are brought into engagement with each other, the supply side gear loosely fastening arms 31*b* of the clutch member 31 are fittingly inserted in the recessed portion in the upper portion of the supply side gear 32 so that the supply side loosely fastening arms 31*b* of the clutch member 31 are brought into press contact with the clutch member loosely fastening wall 32*a*, and the lower end of the cylindrical clutch member 31 is passed through the opening in the center of the supply side gear 32, whereby the meshing teeth 31*a* on the clutch member 31 mesh with the meshing projections 21*b* on the supply bobbin 21.

In addition, the connecting gear 36 is rotatably attached to the connecting gear shaft 26*c* of the first transfer section cover 26, the connecting gear 36 meshes with the supply side gear 32 and the take-up side gear 35, and the take-up assisting portion 39 of the take-up bobbin 22 is rotatably passed through the take-up bobbin passage hole 26*b* in the first transfer section cover 26.

Furthermore, the transfer head holding member 41 is mounted in the front holding portion 26*e* and the rear holding portion 26*f* of the first transfer section cover 26, the flat plate of the transfer head holding member 41 is fitted in the flat plate holding groove 26*h* on the first transfer section cover 26, and the locking member 43 is suspended from the transfer head holding member 41 in such a manner that the locking claw 43*a* thereof is passed through the sliding rail 26*g*, whereby the transfer tape 20, which is wound around the supply bobbin 21 and the take-up bobbin 22 at both the ends thereof, is extended around the transfer head 24.

In addition, in the coating film transfer section 2, the second transfer section cover 27 is placed on the first transfer section cover 26 on which the respective members are mounted from thereabove, and the load adjusting device is made up which produces slip torque by the elastic arms 21*a* of the supply bobbin 21 being brought into press contact with the supply bobbin loosely fastening wall 27*a* in such a manner as to allow for rotation thereof. The locking claw 43*a* of the locking member 43 of the transfer head holding member 41 passes through the sliding rail 27*d*, the flat plate of the transfer head holding member 41 is fitted in the flat plate holding groove 26*h*, whereby the second transfer section cover 27 and the first transfer section cover 26 are fitted together.

Additionally, in the coating film transfer section 2, when the transfer head 24 is slid on the transfer directed object while being kept pressed thereagainst, a tension is produced in the transfer tape 20 which is extended around the transfer head 24, where by a portion of the transfer tape 20 is newly unwound from the supply bobbin 21. The supply bobbin 21 rotates when the transfer tape 20 is so unwound, and the rotation of the supply bobbin 21 is transmitted to the take-up bobbin 22 by means of the rotation transmitting device, whereby the take-up bobbin 22 rotates so as to take up the transfer tape 20 that has been used. In this way, the transfer of the coating film is enabled at all times whenever the transfer head 24 is slid on the transfer directed object while being kept pressed thereagainst.

Figure 5:
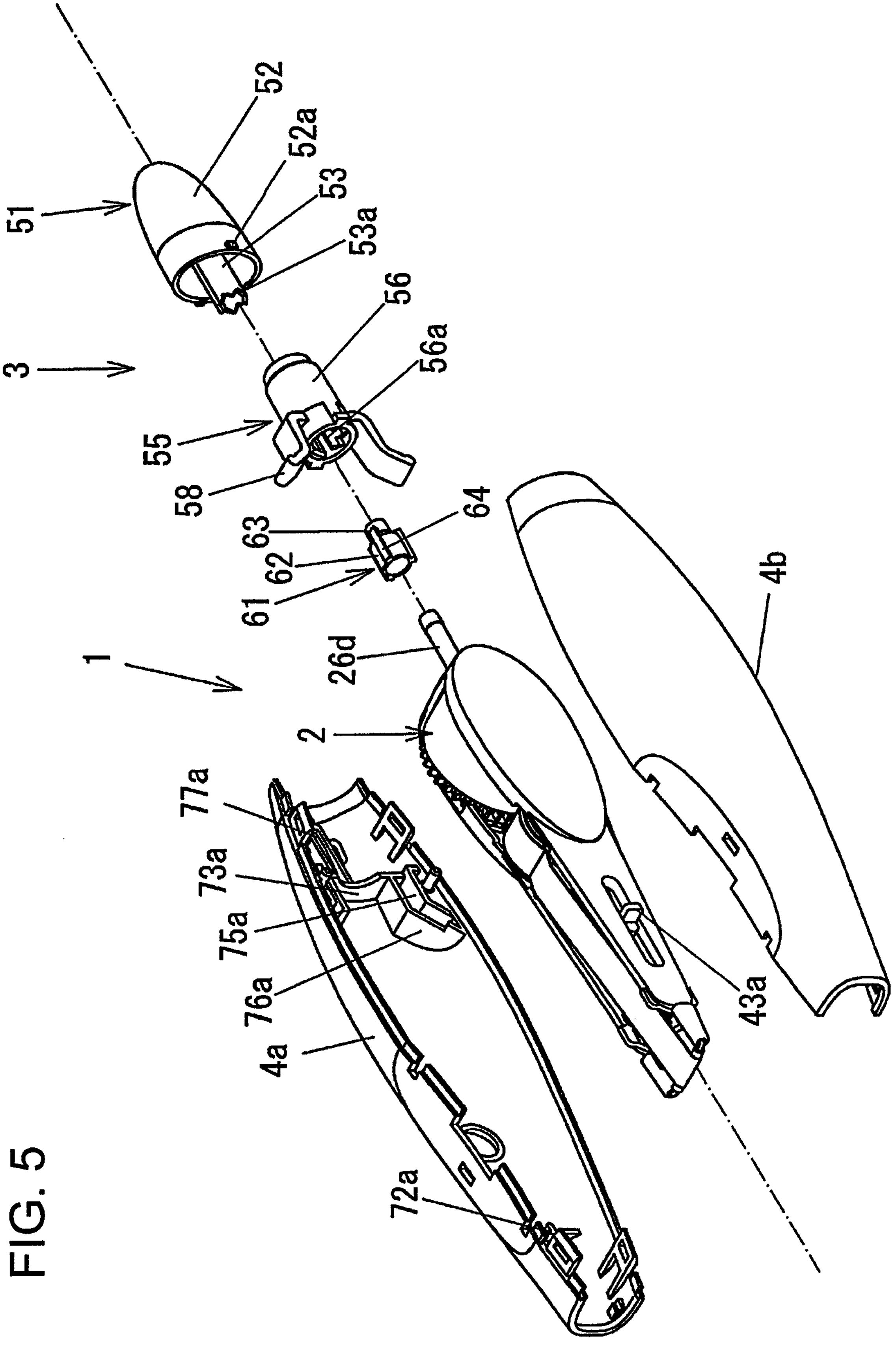
FIG. 5 is an exploded perspective view of the coating film transfer tool according to the invention.

In addition, the operation control unit 3 of the knocking mechanism which slides the coating film transfer section 2 back and forth in order to enable the transfer head 24 to come out of and go back into the accommodation case 4 includes, as is shown in FIG. 5, a knocking member 51 which is operated to make the transfer head 24 come out of and go back into the accommodation case 4, a rotary support member 55 which is disposed between the coating film transfer section 2 and the knocking member 51 and a rotary member 61 which is disposed in an interior of the rotary support member 55 in such a manner as to slide and rotate therein.

The knocking member 51 is made up of a hollow operating portion 52 which is made to open towards the front and is formed into a curved surface at a rear end portion and a circular cylindrical shaft element 53 which extends in an axial direction from an inner circumferential surface at the rear end portion of the operating portion 52. This operating portion 52 has two sliding projections 52*a* in positions which confront each other at a front edge on an outer circumferential surface thereof, and the shaft element 53 is formed in such a manner as to project further forwards than the front edge of the operating portion 52 at a distal end thereof. In addition, a toothed portion 53*a* is formed at a distal end portion of this shaft element 53 by a plurality of inclined portions. Furthermore, an outside diameter of the operating portion 52 is formed slightly smaller than a rear opening formed at a rear end of the accommodation case 4, which will be described later, and by causing the sliding projections 52*a* to fit into sliding grooves 77*a*, 77*b*, respectively, which are formed at the rear end of the accommodation case 4, which will be described later, the operating portion 52 is made to be allowed to slide while being prevented from rotating in the axial direction in such a state that the rear end portion of the operating portion 52 is caused to project from the rear opening in the accommodation case 4.

Figure 6:
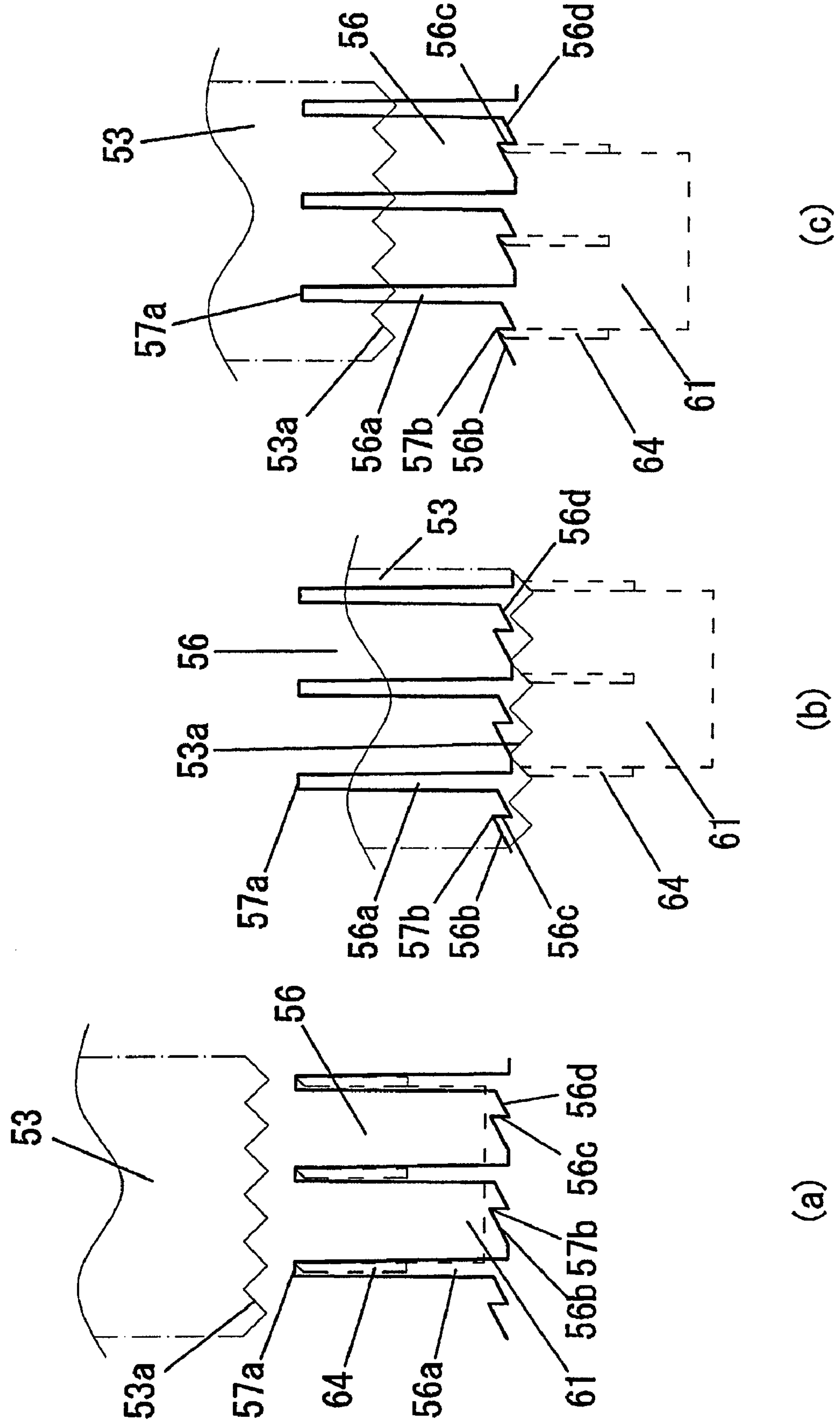
FIG. 6 is a reference diagram which illustrates the operation of an operation control section provided in the coating film transfer tool according to the invention. Additionally.

The rotary support member 55 is made up of a substantially circular cylindrical main body portion 56 which is opened at both front and rear ends thereof and two support arms 58 which are provided in the vicinity of the front end on an outer circumferential surface of the cylindrical main body portion 56. An outside diameter of the cylindrical main body portion 56 is formed smaller than an inside diameter of the operating portion 52 of the knocking member 51, and the shaft element 53 of the knocking member 51 is made to be inserted into an interior space of the cylindrical main body portion 56. In addition, as is shown in FIG. 6, three guide groove portions 56*a* are formed in three circumferential locations on an inner circumferential surface of the cylindrical main body portion 56 at regular intervals in such a manner as to extend in the axial direction, and a first locking portion 57*a* is provided at a rear end of each of the guide groove portions 56*a* so formed. In addition, in a portion held between the adjacent guide groove portions 56*a*, there are formed a first inclined portion 56*b* which is inclined rearwards from a front end of the guide groove portion 56*a* and which has a second locking portion 57*b*, a sliding wall portion 56*c* which extends in the axial direction from a rear end of the first inclined portion 56*b* and a second inclined portion 56*d* which is inclined rearwards from a front end of the sliding wall portion 56*c* and which continues to the guide groove portion 56*a*.

Figure 7:
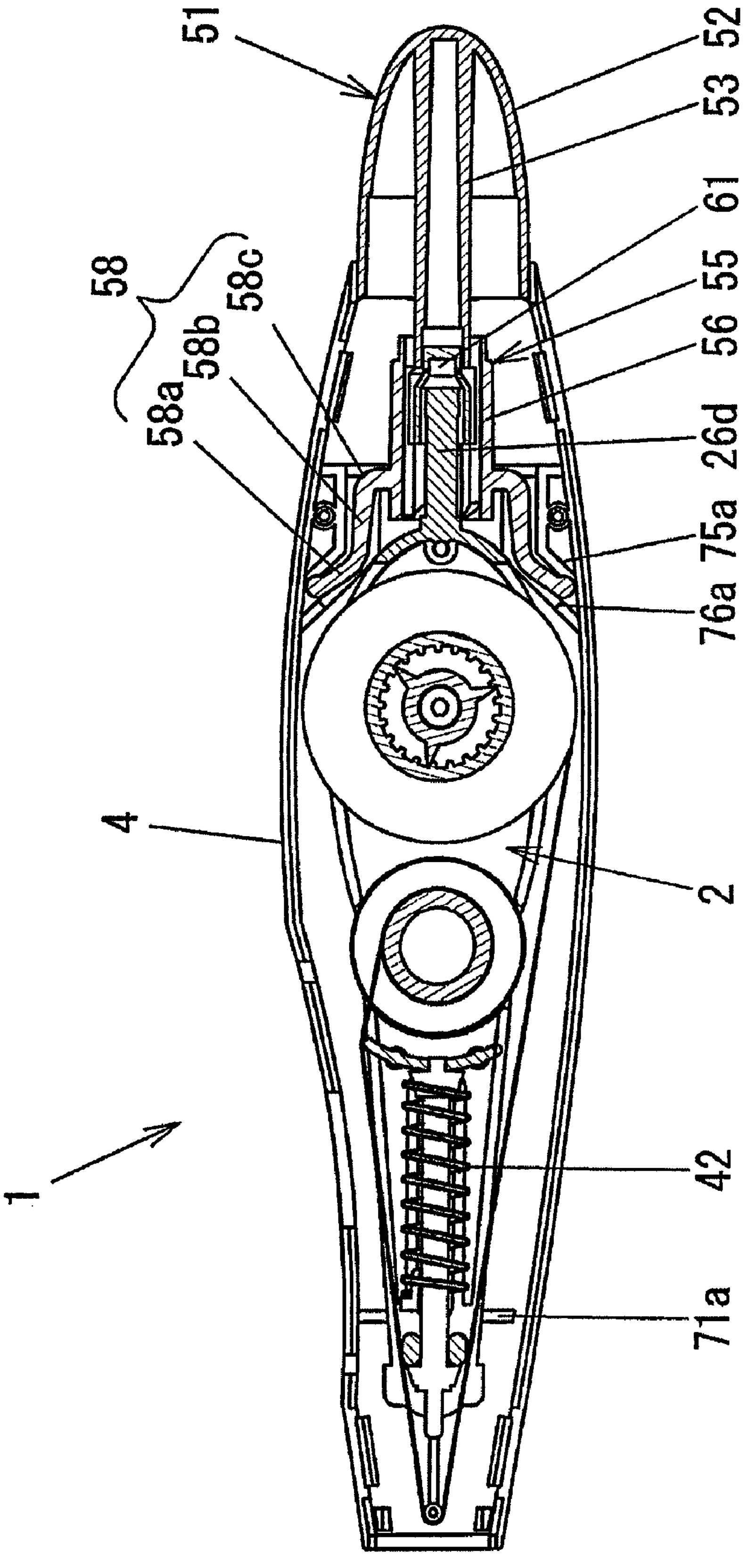
FIG. 7 is a sectional view showing a state in which a transfer head of the coating film transfer tool according to the invention is accommodated.
Figure 8:
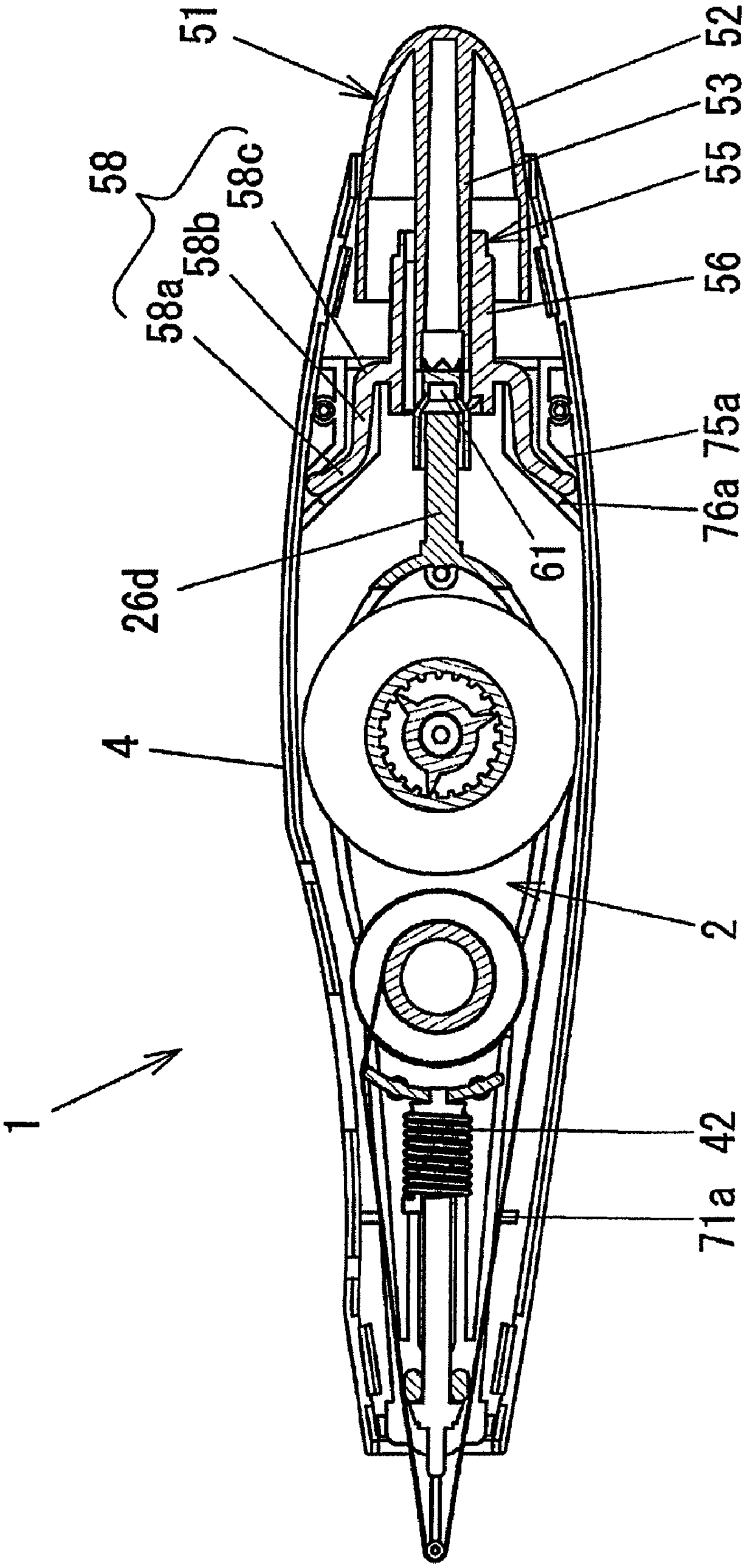
FIG. 8 is a sectional view showing a state in which the transfer head of the coating film transfer tool according to the invention is caused to project.

In addition, the two support arms 58 are formed in the positions confronting each other on a distal end side of the outer circumferential surface of the cylindrical main body portion 56, and as is shown in FIGS. 7 and 8, and the support arm 58 is made up of a shoulder portion 58*c* which projects from the outer circumferential surface of the cylindrical main body portion 56 substantially at right angles, an arm proximal portion 58*b* which continues to the shoulder portion 58*c* and extends forwards in the axial direction and an inclined portion 58*a* which continues to the arm proximal portion 58*b* and which is inclined outwards at a distal end thereof. Consequently, when a pressure is exerted on distal end portions of the support arms 58 from the outside, the support arms 58 are allowed to deflect in a direction in which they approach each other. Furthermore, the support arm 58 is configured such that the arm proximal portion 58*b* and the inclined portion 58*a* are brought into abutment with sliding support portions 75*a*, 75*b* which are formed on the accommodation case 4, which will be described later, such that the cylindrical main body portion 56 is rotatably supported at recessed portions 74*a*, 74*b* in rear fastening portions 73*a*, 73*b* of the accommodation case 4, and such that the arm proximal portion 58*b* and the inclined portion 58*a* of the support arm 58 are disposed within the accommodation case 4 in such a state that the arm proximal portion 58*b* and the inclined portion 58*a* are in abutment with the sliding support portions 75*a*, 75*b*, whereby the shaft element 53 of the knocking member 51 is inserted into the rear end opening of the cylindrical main body portion 56.

The rotary member 61 is made up of a substantially circular cylindrical large diameter portion 62 which is opened at a front end thereof, and a small diameter portion 63 which is provided at the rear of the large diameter portion 62 via a tapered portion which reduces in diameter from a rear edge of the large diameter portion 62, and the large diameter portion 62 includes on an outer circumferential surface thereof linear elongated projecting portions 64 which are adapted to fit in the three guide groove portions 56*a* formed on the rotary support member 55. The large diameter portion 62 has an outside diameter which enables the large diameter portion 62 to be accommodated in an interior of the rotary support member 55, and an inside diameter thereof is formed as a diameter which is slightly larger than an outside diameter of the locking strut 26*d* provided on the first transfer section cover 26 of the coating film transfer section 2 in such a manner as to project therefrom to thereby allow the locking strut 26*d* of the coating film transfer section 2 to be inserted thereinto. In addition, the small diameter portion 63 is formed as an outside diameter which is slightly smaller than an inside diameter of the shaft element 53 of the knocking member 51 to thereby be allowed to be inserted into the shaft element 53. The linear elongated projecting portion 64 is such as to be formed from a front end of the small diameter portion 63 to the vicinity of a front end of the large diameter portion 62, and a rear end portion of the linear elongated projecting portion 64 is formed in such a manner as to have a sloping or inclined surface which substantially coincides with the inclinations of the first inclined portion 56*b* and the second inclined portion 56*d* which are formed on the inner circumferential surface of the rotary support member 55.

Figure 9:
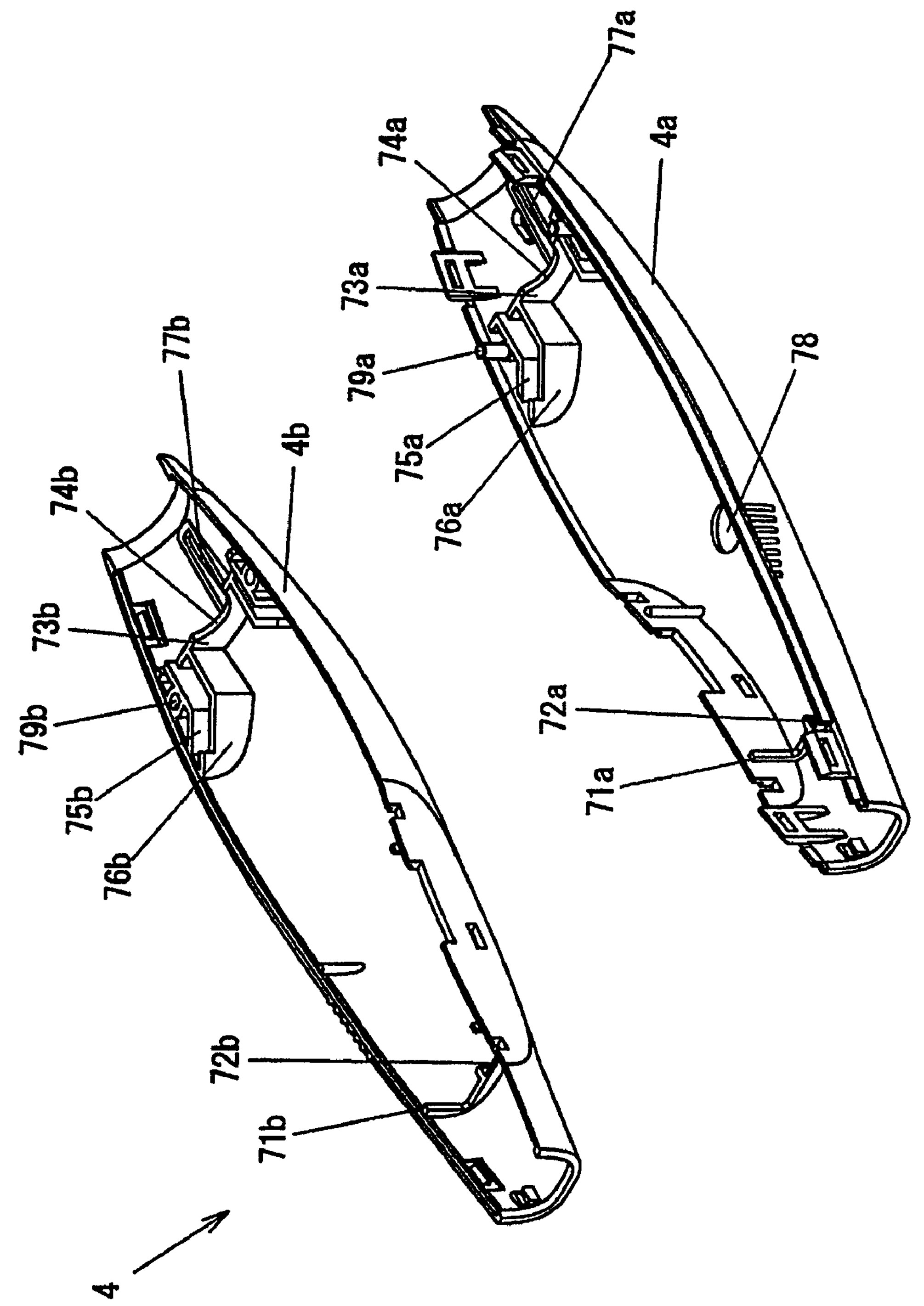
FIG. 9 is an exploded perspective view of an accommodation case of the coating film transfer tool according to the invention.

The accommodation case 4, which incorporates therein the coating film transfer section 2, the knocking member 51, the rotary support member 55 and the rotary member 61, is, as shown in FIG. 9, made up of the first accommodation case 4*a* and a second accommodation case 4*b* and is formed into a longitudinally elongated accommodation case 4 as a whole which can be operated while being held with one hand.

The first accommodation case 4*a* is formed into a substantially U-shape in cross section by a side plate portion which is formed narrower at a front end and a rear end thereof as viewed from the front and circumferential edge portions which are formed to extend respectively from both side edges of the side plate portion at substantially right angles thereto. In the vicinity of a front end of an inner circumferential surface of the side plate portion, a front fastening portion 71*a*, which constitutes a linear elongated stepped portion, is formed in such a manner as to extend in a width or transverse direction of the side plate portion, and small projections are provided in two portions on a rear surface of the front fastening portion 71*a* in such a manner as to project therefrom so as to form a locking portion 72*a*, in which the locking member 43 provided on the coating film transfer section 2 is locked, in a substantially central position of the front fastening portion 71*a*.

In addition, in the vicinity of the rear end on the inner circumferential surface of the side plate portion, the rear fastening portion 73*a* having a height which is slightly shorter than the width of the circumferential edge portion is formed in such a manner as to extend in the transverse direction of the side plate portion, and a substantially central portion of the rear fastening portion 73*a* is cut out along a side edge thereof into an arc shape which substantially coincides with the outer circumferential surface of the aforesaid rotary support member 55 so as to form the recessed portion 74*a* in which the rotary support member 55 is disposed. Holding portions 76*a* are formed on both outer sides of the recessed portion 74*a* on a front surface of the rear fastening portion 73*a*, respectively, in such a manner as to be inclined towards the circumferential edge portion at a distal end while extending along the axial direction of the first accommodation case 4*a* at a rear end thereof, and being located in positions which are symmetrical with each other about a center axis of the accommodation case, the holding portions 76*a* are formed into a substantially downwardly-diverging shape as viewed from the front. In addition, the sliding support portions 75*a* are provided outwards of each of the holding portions 76*a* in such a manner as to extend parallel to the holding portions 76*a*, and the sliding support portions 75*a* are formed in such a manner as to project further upwards than the holding portion 76*a*. In addition, the sliding groove 77*a* into which the sliding projection 52*a* of the knocking member 51 is to be fitted is formed at a substantially center position of the side plate portion from a rear surface of the rear fastening portion 73*a* by two linear elongated stepped portions which extend from the rear surface of the rear fastening portion 73*a* in the axial direction and which are connected to each other at rear end portions thereof. In addition, the take-up hole 78 is formed in the vicinity of the center of the side plate portion through which the take-up assisting portion 39 of the coating film transfer section 2 is operated from the outside of the accommodation case 4 for adjusting the tension on the transfer tape.

The second accommodation case 4*b* is a member which corresponds to the first accommodation case 4*a* and is formed into a substantially U-shape in cross section by a side plate portion which is formed narrower at a front end and a rear end thereof as viewed from the front and circumferential edge portions which are formed to extend respectively from both side edges of the side plate portion at substantially right angles thereto. In the vicinity of a front end of an inner circumferential surface of the side plate portion, a front fastening portion 71*b*, which constitutes a linear elongated stepped portion, is formed in such a manner as to extend in a width or transverse direction of the side plate portion, and small projections are provided in two portions on a rear surface of the front fastening portion 71*b* in such a manner as to project there from so as to form a locking portion 72*b*, in which the locking member 43 provided on the coating film transfer section 2 is locked, in a substantially central position of the front fastening portion 71*b*.

In addition, in the vicinity of the rear end on the inner circumferential surface of the side plate portion, a rear fastening portion 73*b* having a height which is slightly shorter than the width of the circumferential edge portion is formed in such a manner as to extend in the transverse direction of the side plate portion, and a substantially central portion of the rear fastening portion 73*b* is cut out along a side edge thereof into an arc shape which substantially coincides with the outer circumferential surface of the rotary support member 55 so as to form the recessed portion 74*b* in which the rotary support member 55 is disposed. Holding portions 76*b* are formed on both outer sides of the recessed portion 74*b* on a front surface of the rear fastening portion 73*b*, respectively, in such a manner as to be inclined towards a circumferential edge portion at a distal end while extending along the axial direction of the second accommodation case 4*b* at a rear end thereof, and being located in positions which are symmetrical with each other about a center axis of the accommodation case, the holding portions 76*b* are formed into a substantially downwardly-diverging shape as viewed from the front. In addition, the sliding support portions 75*b* are provided outwards of each of the holding portions 76*b* in such a manner as to extend parallel to the holding portions 76*b*, and the sliding support portions 75*b* are formed in such a manner as to project further upwards than the holding portion 76*b*. Consequently, when the first accommodation case 4*a* and the second accommodation case 4*b* are integrated with each other, the holding portions 76*a*, 76*b* and the sliding support portions 75*a*, 75*b* form a stepped portion which can support the support arm 58 of the rotary support member 55. In addition, the sliding groove 77*b* into which the sliding projection 52*a* of the knocking member 51 is to be fitted is formed at a substantially center position of the side plate portion from a rear surface of the rear fastening portion 73*b* by two linear elongated stepped portions which extend from the rear surface of the rear fastening portion 73*b* in the axial direction and which are connected to each other at rear end portions thereof.

In addition, respective circumferential edge portions of the first accommodation case 4*a* and the second accommodation case 4*b* are formed, respectively, as a recessed portion and a raised portion or vice versa, and locking projecting portions are formed in the vicinity of front and rear ends of the first accommodation case 4*a* and locking receiving portions are formed in the vicinity of front end and rear ends of the second accommodation case 4*b*, or vice versa. Furthermore, an assembling shaft portion 79*a* is provided on the inner surface of the side plate portion of either of the first accommodation case 4*a* and the second accommodation case 4*b* in such a manner as to project from circumferential edge portions, and a shaft receiving hole 79*b*, into which the assembling shaft portion 79*a* is fitted, is formed on the inner surface of the side plate portion of the other case. Consequently, by assembling the first accommodation case 4*a* and the second accommodation case 4*b* to each other, a hollow accommodation case is produced with a front opening and a rear opening formed at a front end and a rear end thereof, respectively.

The coating film transfer section 2, the knocking member 51, the rotary support member 55 and the rotary member 61 are, as shown in FIGS. 5 and 7, assembled together as on the same axis by inserting the locking strut 26*d* of the coating film transfer section 2 into the rotary member 61, disposing the linear elongated projecting portions 64 to be positioned in the guide groove portions 56*a* when fitting the rotary member 61 in the interior of the rotary support member 55, and inserting the shaft element 53 of the knocking member 51 from the opening at the rear end of the rotary support member 55 in such a manner that the toothed portion 53*a* of the shaft element 53 is brought into engagement with the linear elongated projecting portions 64 on the rotary member 61. Then, the rotary support member 55 is supported by the recessed portions 74*a*, 74*b* of the rear fastening portions 73*a*, 73*b* and the sliding support portions 75*a*, 75*b* of the accommodation case 4, and furthermore, the locking claws 43*a* provided on the locking portion 43 of the coating film transfer section 2 are brought into engagement with the locking portions 72*a*, 72*b* which are formed on the front fastening portions 71*a*, 71*b* of the accommodation case 4, while the sliding projections 52*a* of the knocking member 51 are brought into engagement with the sliding grooves 77*a*, 77*b* which are formed at the rear of the rear fastening portions 73*a*, 73*b* of the accommodation case 4, whereby the coating film transfer section 2, the knocking member 51, the rotary support member 55 and the rotary member 61 are accommodated within the accommodation case 4. As this occurs, the pressing spring 42 mounted in the coating film transfer section 2 is in an extended state so as to bias the coating film transfer section 2 to the rear, and the rotary member 61 is positioned at the rear of the rotary support member 55, whereby the coating film transfer section 2 is put in a withdrawal state in which the transfer head 24 is accommodated within the accommodation case 4.

Next, the operation of the coating film transfer tool 1 of the invention will be described.

As is shown in FIG. 7, in such a state that the transfer head 24 is withdrawn into the interior of the accommodation case 4 for accommodation therein, as is shown in FIG. 6A, the linear elongated projecting portions 64 of the rotary member 61 are fitted in the guide groove portions 56*a* of the rotary support member 55, and the rear end portions of the linear elongated projecting portions 64 are locked in the first locking portions 57*a* of the guide groove portions 56*a*, respectively.

When the knocking member 51 is knocked from the rear, the rear end portions of the linear elongated projecting portions 64 are pushed by the shaft element 53 of the knocking member 51 against the spring force exerted by the pressing spring 42, whereby the linear elongated projecting portions 64 slides forwards in the guide groove portions 56*a*. As this occurs, the coating film transfer section 2, which is locked at the rotary member 61 via the locking strut 26*d*, is also caused to move forwards. When the rear end portions of the linear elongated projecting portions 64 slide beyond the front end portions of the guide groove portions 56*a*, as is shown in FIG. 6B, the inclined surfaces at the rear of the linear elongated projecting portions 64 are brought into contact with the inclined portions of the toothed portion 53*a* at the distal end portion of the shaft element 53, whereby the rotary member 61 is biased to the rear by the pressing spring 42. In addition, since the knocking member 51 is mounted in the accommodation case 4 in such a manner as to be prevented from rotating, the linear elongated projecting portions 64 move to the rear while rotating along the slopes of the toothed portion 53*a*. When the inclined surfaces of the linear elongated projecting portions 64 of the rotary member 61 which have so moved while rotating come into contact with the first inclined portions 56*b*, the linear elongated projecting portions 64 slide to the rear along the inclinations of the first inclined portions 56*b* and are locked in the second locking portions 57*b* as is shown in FIG. 6C. Then, as is shown in FIG. 8, the rotary member 61 is fixed in such a state that the rotary member 61 projects from the rotary support member 55, and the coating film transfer section 2, which is in engagement with the rotary member 61, is also fixed in an advanced position, whereby the transfer head 24 is caused to project from the accommodation case 4. As this occurs, since the locking member 43, which is mounted on the coating film transfer section 2, is locked in the accommodation case 4, the pressing spring 42 is put in a compressed state.

Then, when the knocking member 51 is knocked again, the linear elongated projecting portions 64 of the rotary member 61 which are locked in the second locking portions 57*b* are pushed by the toothed portion 53*a* of the knocking member 51 and then slide to the front along the sliding wall portions 56*c* against the spring force exerted by the pressing spring 42. Then, when the linear elongated projecting portions 64 slide beyond the front end portions of the sliding wall portions 56*c*, the linear elongated projecting portions 64 slide to the rear along the inclinations of the second inclined portions 56*d* by virtue of the biasing force of the pressing spring 42 exerted to the rear and then fit in the guide groove portions 56*a* which continue from the second inclined portions 56*d* to thereby be locked in the first locking portions 57*a*. When the rotary member 61 slides to the rear end position of the rotary support member 55, the coating film transfer section 2 is also withdrawn by virtue of the biasing force of the pressing spring 42, whereby the transfer head 24 is withdrawn into the accommodation case 4 for accommodation therein.

In this invention, the rotary support member 55 which locks the rotary member 61 has support arms 58. The support arms 58 are disposed in the accommodation case 4 in such a state that the support arms 58 are in abutment with sliding support portions 75*a*, 75*b* which are formed in the side plate portion of the accommodation case 4. When a pressure is exerted on the transfer head 24, support arms 58 are bowed along the sliding support portions 75*a*, 75*b* and then the rotary support member 55 slides slightly to the rearward. In accordance with the slide motion of the rotary support member 55 to the rearward, the coating film transfer section 2 which is biased to the rearward by the pressing spring 42 is withdrawn, thereby the coating film transfer section 2 can be slightly moved back and forth in accordance with the pressing force to the transfer head 24. Consequently, the pressing force on the transfer head 24 can be absorbed and the operability of coating film transfer tool 1 can be improved.

Additionally, in the present invention, the sliding projections 52*a* are provided in the knocking member 51, while sliding grooves 77*a*, 77*b* are formed in the inner circumferential surface of the accommodation case 4 in such a manner that the sliding projections 58*a* are meshed therewith. Hence, the knocking member 51 is allowed to slide along the axial direction back and forth while being prevented from rotating. Additionally, the sliding grooves can be formed on the knocking member 51 and the sliding projections can be formed in the inner circumferential surface of the accommodation case 4 in such a manner as to be meshed each other.

Note that the present invention is not limited to the embodiment and modified example that have been described heretofore and hence can be modified or improved freely without departing from the spirit and scope of the invention.

INDUSTRICAL APPLICABILITY

According to the coating film transfer tool of the invention that has been described heretofore, since the rotary support member with which the rotary member, which is provided to cause the coating film transfer section to come out of and go back into the accommodation case in such a manner as to rotate, is locked has the flexible support arms, when a pressure is exerted on the transfer head, the support arm of the rotary support member is bowed along the sliding support portion according to the pressing force and then the rotary support member is slightly withdrawn. Hence, the coating film transfer section is withdrawn with backward movement of the rotary support member, thereby the coating film transfer section can be slightly moved back and forth in accordance with a pressing force on the transfer head. Consequently, the pressure on the transfer head can be absorbed and the operability of coating film transfer tool can be improved.

What is claimed is:

1. A coating film transfer tool having an accommodation case therein comprising:

a coating film transfer section therein including a supply bobbin around which an unused transfer tape is wound, a take-up bobbin which takes up the transfer tape that has been used, a rotation transmitting device for transmitting the rotation of the supply bobbin to the take-up bobbin, and a transfer head around which the transfer tape that has been unwound from the supply bobbin is suspended in such a manner as to be projected from the coating film transfer section;

a knocking member that is projected from the rear end of the accommodation case;

a rotary member and a rotary support member which are disposed between the coating film transfer section and the knocking member; and an elastic member that biases the coating film transfer section to the rearward; and sliding support portions, wherein:

the rotary support member has flexible support arms configured to flex outwards so that the coating film transfer section can be slightly moved within the accommodation case back and forth according to a pressure on the transfer head;

the support arms are respectively formed by a shoulder portion which projects from either one of both sides of the rotary support member, an arm proximal portion which continues to the shoulder portion and extends forwards, and an inclined portion which continues to the arm proximal portion and is inclined outwards at a distal end thereof in such a manner that a distal end of the support arm is inclined to the axial direction of the accommodation case;

the sliding support portions abut respective support arms and are respectively formed so as to be inclined on an inner circumferential surface of each accommodation case in such a manner that a rear end side thereof is directed to a central axis direction of the accommodation case and a distal end side thereof is directed to an outer side; and the knocking member has a sliding projection and the inner circumferential surface of the accommodation case has a sliding groove, or vice versa, configures so the knocking member is slideable relative to the accommodation case by meshing the sliding projection with the sliding groove.

* * * * *